UNITED STATES PATENT OFFICE.

HARRY A. BABIS, OF PHILADELPHIA, PENNSYLVANIA.

LIQUID COATING COMPOSITION.

1,392,040. Specification of Letters Patent. Patented Sept. 27, 1921.

No Drawing. Application filed June 1, 1920. Serial No. 385,609.

*To all whom it may concern:*

Be it known that I, HARRY A. BABIS, a subject of the present Government of Russia, having declared my intention of becoming a citizen of the United States, and now residing in the city and county of Philadelphia, State of Pennsylvania, have invented a new and useful Liquid Coating Composition, of which the following is a specification.

In a prior Patent, No. 1,330,421, granted to me February 10th, 1920, I have disclosed and broadly claimed a novel construction of a liquid composition adapted for use as a waterproof covering or paint for metallic and other surfaces to preserve them from rust and deterioration.

While the device of my prior patent aforesaid is in practice efficient and satisfactory, I have found that when it is desired to use my novel composition under damp conditions or for use principally as a waterproof coating, or for roofing purposes, that it is sometimes desirable that certain ingredients be added to the composition of my prior patent to give a somewhat softer or more pliable finish to the coated surface, and it is also sometimes desirable to employ a certain additional ingredient for the purpose of a binder to keep all the ingredients of my novel composition intact, when the coated surface is liable to be subjected to damp weather, the novel features and ingredients of my present invention being hereinafter fully set forth.

To the above ends, my invention consists of a novel composition of matter in liquid form, which is applicable particularly not only for the filling in of cavities in the surfaces of metals and other materials, but which also efficiently serves as a waterproof covering or paint for such surfaces to preserve them from rust, my composition being particularly adapted for use in damp climates or under damp or rainy conditions or for use as a roof covering.

My novel liquid composition consists of solutions of the following ingredients, which may be compounded and commingled in any preferred manner:—

First,—pine tar;

Second,—Canadian or Burgundy pitch, dissolved in alcohol, ether or acetone;

Third,—celluloid dissolved in acetone or wood alcohol;

Fourth,—plaster of Paris;

Fifth,—a metallic or chemical coloring matter;

Sixth,—japan, which is added to make the composition much easier to dry.

For certain uses, I may substitute rosin instead of the second named solution, and add to the solution so formed the third solution above-named.

While I do not, of course, desire to limit myself to absolutely definite quantities of the ingredients I use, I find that to make, for instance, one hundred and twenty pounds of my composition, I can use approximately in the second solution which contains the pitch, fifteen pounds of the pitch commingled with fifteen pounds of pine tar or thirty pounds of pine tar alone and sixty pounds of the solvent of wood alcohol, or acetone mixed with ether,—adding thereto seven pounds of the third or dissolved celluloid solution, three pounds of japan, and twenty pounds of plaster of Paris.

When, upon the other hand, my composition is to be made from a solution containing rosin, pitch and pine tar instead of the pitch alone, the proportions to which I resort for the making of a given one hundred and twenty pounds, are pitch, seven and one-half pounds,—pine tar, seven and one-half pounds,—rosin alone, fifteen pounds,—ether, acetone or wood alcohol, sixty pounds,—and I add thereto seven pounds of the celluloid solution, twenty pounds of plaster of Paris and three pounds of japan. The pine tar employed makes the painted surface softer and more pliable, and the plaster of Paris effectively serves as a filler for all of the ingredients.

When it is desired to use my composition not only as a waterproof composition, but also as a coloring composition, I introduce within and throughout the ultimate commingled solution, either metallic or chemical coloring matter of the desired proportions and tints.

It will now be apparent that I have devised a novel and useful liquid coating composition, which embodies the features of advantage enumerated as desirable in the statement of the invention and the above description, and while I have, in the present instance, shown and described a preferred embodiment thereof which will give in practice satisfactory and reliable results, it is to be understood that my novel composition is susceptible of modification in various particulars without departing from the spirit or scope of the invention or sacrificing any of its advantages.

Having thus described my invention, what I claim as new and desire to secure by Letters Patent, is:—

1. A liquid composition adapted as a waterproof coating and comprising pine tar, Burgundy pitch, ether, japan, plaster of Paris, celluloid and acetone.

2. A liquid composition adapted as a waterproof coating and comprising pine tar, rosin, Burgundy pitch, ether, japan, plaster of Paris, celluloid and acetone.

3. A liquid composition adapted as a waterproof coating and comprising seven and one-half parts of pine tar, seven and one-half parts of pitch, fifteen parts of rosin, thirty parts of ether, thirty parts of acetone or wood alcohol, three parts of japan, seven parts of celluloid, and twenty parts of plaster of Paris.

HARRY A. BABIS.

Witnesses:
HARRY M. SEIDENBERG,
E. HAYWARD FAIRBANKS.